United States Patent
Meeuwissen et al.

(10) Patent No.: US 9,163,560 B2
(45) Date of Patent: Oct. 20, 2015

(54) METHOD FOR SWITCHING OVER A GAS TURBINE BURNER OPERATION FROM LIQUID TO GAS FUEL AND VICE-VERSA

(75) Inventors: Thiemo Meeuwissen, Ennetbaden (CH); Stanka Kokanovic, Berlin (DE); Susanne Renate Schell, Baden (CH); Rudolf Lachner, Attenkirchen (DE)

(73) Assignee: ALSTOM TECHNOLOGY LTD., Baden (CH)

( * ) Notice: Subject to any disclaimer, the term of this patent is extended or adjusted under 35 U.S.C. 154(b) by 200 days.

(21) Appl. No.: 13/411,797

(22) Filed: Mar. 5, 2012

(65) Prior Publication Data

US 2012/0247116 A1   Oct. 4, 2012

Related U.S. Application Data

(63) Continuation of application No. PCT/EP2010/063053, filed on Sep. 6, 2010.

(30) Foreign Application Priority Data

Sep. 7, 2009   (EP) ..................................... 09169580

(51) Int. Cl.
    *F02C 3/20*   (2006.01)
    *F02C 3/22*   (2006.01)
    (Continued)

(52) U.S. Cl.
    CPC ... *F02C 3/22* (2013.01); *F02C 3/24* (2013.01); *F02C 7/228* (2013.01); *F23D 17/002* (2013.01); *F23R 3/286* (2013.01); *F23R 3/343* (2013.01)

(58) Field of Classification Search
    CPC .............. F02C 3/30; F02C 3/305; F02C 7/22; F02C 9/26; F02C 9/263; F02C 9/34; F02C 9/40; F23R 3/34; F23R 3/343; F23R 3/346; F23R 3/36

USPC ....................... 60/39.463, 776, 740, 737, 742
See application file for complete search history.

(56) References Cited

U.S. PATENT DOCUMENTS 4,817,568 A * 4/1989 Bedford ......................... 123/431
5,404,711 A * 4/1995 Rajput ......................... 60/39.463
(Continued)

FOREIGN PATENT DOCUMENTS

CN   1227310 A   9/1999
CN   1884910 A   12/2006
(Continued)

OTHER PUBLICATIONS

English language version of Japanese Office Action (Notification of Reasons for Refusal) dated Apr. 7, 2014, issued by the Japanese Patent Office in corresponding Japanese Patent Application No. 2012-527348. (5 pages).

(Continued)

*Primary Examiner* — Devon Kramer
*Assistant Examiner* — Vikansha Dwivedi
(74) *Attorney, Agent, or Firm* — Buchanan Ingersoll & Rooney

(57) ABSTRACT

A method is provided for switching over a gas turbine burner operation from liquid fuel to gas fuel and vice-versa, with the burner comprising nozzles for feeding a premixed gas fuel, nozzles for injecting a pilot gas fuel and nozzles for injecting a liquid fuel. According to the method, while the liquid fuel and the premix gas fuel are regulated to switch over from liquid fuel to gas fuel operation or vice-versa, the pilot gas fuel is controlled at a substantially constant flow rate.

18 Claims, 2 Drawing Sheets

(51) Int. Cl.
*F02C 3/24* (2006.01)
*F02C 7/228* (2006.01)
*F23D 17/00* (2006.01)
*F23R 3/28* (2006.01)
*F23R 3/34* (2006.01)

(56) References Cited

U.S. PATENT DOCUMENTS

| | | | |
|---|---|---|---|
| 5,836,163 A | 11/1998 | Lockyer et al. | |
| 6,256,975 B1 | 7/2001 | Dobbeling et al. | |
| 7,568,907 B2 * | 8/2009 | Carroni et al. | 431/7 |
| 7,770,400 B2 | 8/2010 | Iasillo et al. | |
| 8,033,821 B2 * | 10/2011 | Eroglu | 431/9 |
| 8,656,699 B2 | 2/2014 | Saito et al. | |
| 2004/0035114 A1 | 2/2004 | Hayashi et al. | |
| 2004/0118557 A1 * | 6/2004 | Ancimer et al. | 166/227 |
| 2010/0273117 A1 * | 10/2010 | Eroglu | 431/9 |

FOREIGN PATENT DOCUMENTS

| | | |
|---|---|---|
| JP | 9-229362 A | 9/1997 |
| JP | 2000-328965 A | 11/2000 |
| JP | 2001-59427 A | 3/2001 |
| JP | 2004-27896 A | 1/2004 |
| JP | 2007-327338 A | 12/2007 |
| JP | 2008-163939 A | 7/2008 |
| JP | 2009-133517 A | 6/2009 |
| WO | WO 2009068425 A1 * | 6/2009 |

OTHER PUBLICATIONS

Chinese Office Action (First Office Action) dated Dec. 16, 2013, issued by the State Intellectual Property Office of the People's Republic of China in corresponding Chinese Patent Application No. 201080037516.3. (13 pages).

* cited by examiner

ME THOD FOR SWITCHING OVER A GAS TURBINE BURNER OPERATION FROM LIQUID TO GAS FUEL AND VICE-VERSA

CROSS REFERENCE TO RELATED APPLICATION

This application is a continuation of International Application No. PCT/EP2010/063053 filed Sep. 6, 2010, which claims priority to European Patent Application No. 09169580.9, filed Sep. 7, 2009, the entire contents of all of which are incorporated by reference as if fully set forth.

FIELD OF INVENTION

The present invention relates to method for switching over a gas turbine burner operation from liquid to gas fuel and vice-versa.

For example the present method may be used for fuel switching over of gas turbines having conical premix burners. For sake of clarity reference to such conical premix burners is made in the following, it is anyhow clear that the method may also be used for different burners.

BACKGROUND

With reference to FIG. 1, conical premix burners 1 are known to comprise two (or also more than two) substantially conical walls 2 that define a conical swirl chamber 3.

The conical walls 2 define slots 5 for air entrance and are also provided with nozzles 6 for premix gas fuel injection into the swirl chamber 3 (premix meaning that this burner has a premix operation).

In addition, the burner 1 has a lance 7 having nozzles 8 for pilot gas fuel injection and further nozzles 9 for liquid fuel injection (typically located at the tip of the lance 7).

The walls 2 are connected through a front panel 10 to a combustion chamber 11. In FIG. 1 nozzles 8 are shown at the side of the lance 7, nevertheless in different examples the nozzles 8 for pilot gas fuel can be located at the tip of the lance 7 or at the front panel 10.

Typically pilot gas fuel generates a diffusion flame and the premix gas fuel generates a premix flame, nevertheless in different examples the pilot gas fuel may also generate a flame being a hybrid between diffusion and premix flame.

Two different operations (either with liquid or gas fuel) are possible for this kind of burner.

GAS FUEL OPERATION—During gas fuel operation, the nozzles 6 inject premix gas fuel and the nozzles 8 inject pilot gas fuel; the nozzles 9 do not inject any liquid fuel.

Therefore, compressed air enters through the slots 5 into the swirl chamber 3 and gas fuel is supplied via nozzles 6 and 8; in the swirl chamber 3 air and gas fuel mix forming a mixture that is combusted in the combustion chamber 11 (reference 13 indicates the flame).

LIQUID FUEL OPERATION—During liquid fuel operation, the nozzles 9 inject liquid fuel, whereas the nozzles 6 and 8 do not inject any fuel.

Also in this case compressed air enters through the slots 5 into the swirl chamber 3 and liquid fuel is supplied via nozzles 9; in the swirl chamber 3 air and liquid fuel mix forming a mixture that is combusted in the combustion chamber 11 (reference 13 indicates the flame).

SWITCH OVER—In order to switch from gas fuel operation to liquid fuel operation, traditionally the gas fuel flow rate injected into the swirl chamber 3 via nozzles 6 (premix gas nozzles) and 8 (pilot gas nozzles) is decreased together (i.e. both the premix gas fuel flow rate and pilot gas fuel flow rate are decreased at the same time) and, in addition, the liquid fuel flow rate is increased.

Decrease of gas fuel flow rate and increase of liquid fuel flow rate are carried out with substantially linear functions, from the initial flow rates (100% gas fuel and 0% liquid fuel) to the final flow rate (0% gas fuel and 100% liquid fuel).

Switching over from liquid fuel to gas fuel operation is carried out in the same way, i.e. liquid fuel flow rate is decreased from 100% to 0%, while both premix gas fuel and pilot gas fuel are increased at the same time from 0% to 100%.

Even if largely used, in some cases this switch over method proved to cause unstable gas turbine operation.

In other words, while premix gas fuel and pilot gas fuel decrease and liquid fuel increases, or liquid fuel decreases and premix gas fuel and pilot gas fuel increase the flame stability can be influenced such that large pressure pulsations are generated.

Pressure pulsation are known to be very detrimental for the gas turbine lifetime because they stress not only the burners and combustion chambers wherein they are generated, but also other components such as flue gas discharge systems.

WO2009/068425 discloses a gas turbine able to operate with a gas fuel and a liquid fuel and, in addition, also provided with a pilot gas fuel and a pilot liquid fuel. This documents does not give any suggestion on how a switch over from liquid to gas fuel and vice versa can be carried out.

SUMMARY

The present disclosure is directed to a method for switching over a gas turbine burner operation from liquid fuel to gas fuel and vice-versa. The burner includes nozzles for feeding a premixed gas fuel, nozzles for injecting a pilot gas fuel and nozzles for injecting a liquid fuel. The method includes regulating the liquid fuel and the premix gas fuel to switch over from liquid fuel to gas fuel operation or vice-versa while controlling the pilot gas fuel at a substantially constant flow rate.

BRIEF DESCRIPTION OF THE DRAWINGS

Further characteristics and advantages of the invention will be more apparent from the description of a preferred but non-exclusive embodiment of the method according to the invention, illustrated by way of non-limiting example in the accompanying drawings, in which.

DETAILED DESCRIPTION OF THE PREFERRED EMBODIMENTS

Introduction to the Embodiments

Figure 1:
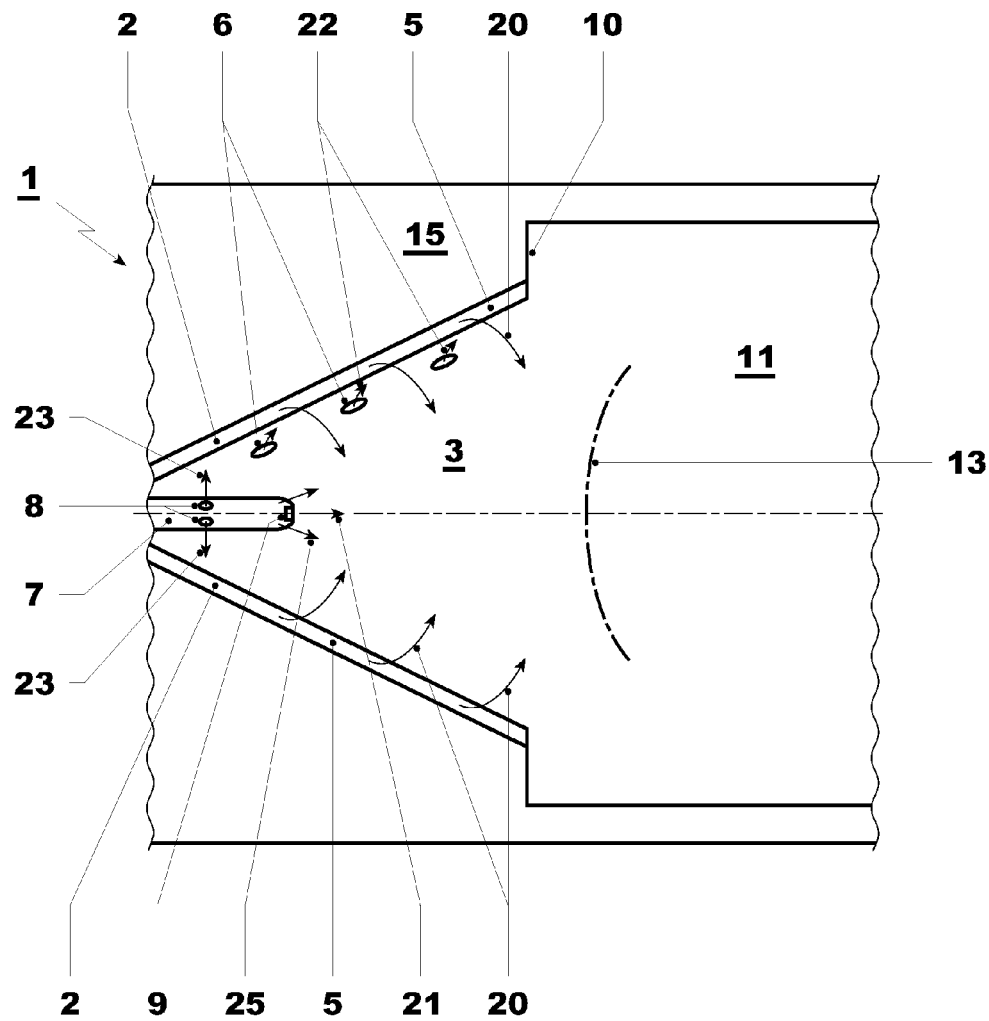
FIG. 1 is a schematic cross section of a burner.

The technical aim of the present invention is therefore to provide a method by which the said problems of the known art are eliminated.

Within the scope of this technical aim, an aspect of the invention is to provide a method with which the gas turbine operation is very stable also during switch over, such that no pressure pulsations are generated, neither during switch over from gas fuel operation to liquid fuel operation, nor from liquid fuel operation to gas fuel operation.

The technical aim, together with these and further aspects, are attained according to the invention by providing a method in accordance with the accompanying claims.

DETAILED DESCRIPTION

The burner 1 is a premixed burner and has nozzles 6 for feeding a premixed gas fuel, nozzles 8 for injecting a pilot gas fuel 23 and nozzles 9 for injecting a liquid fuel 21.

For example the conical burner 1 is a traditional burner having the features already described with reference to FIG. 1. Naturally, other kinds of burners are also possible.

In this respect, the burner 1 is contained within a plenum 15 wherein compressed air 20 (from the compressor) is introduced; this compressed air passes through the slots 5 to enter the swirl chamber 3.

According to the method, while the liquid fuel 21 and the premix gas fuel 22 are regulated to switch over from liquid fuel to gas fuel operation or vice-versa, the pilot gas fuel 23 is controlled at a substantially constant flow rate (i.e. small changes of the pilot gas fuel flow rate are possible, but they do not affect the operation of the burner).

In particular, when the liquid fuel 21 is regulated to decrease its flow rate, the premix gas fuel 22 is regulated to increase its flow rate and vice-versa.

Advantageously, during premix gas fuel regulation, the pilot gas fuel 23 flow rate is controlled at a substantially constant flow rate to control the flame stability.

Pilot gas is regulated before or after premix gas regulation. In particular, during switching over from gas to liquid fuel operation, pilot gas fuel 23 is regulated after premix gas fuel 22 regulation to be switched off, and during switching over from liquid to gas fuel operation, pilot gas fuel 23 is regulated before premix gas fuel 22 regulation to be increased up to the operating flow rate.

In addition, while the liquid fuel 21 flow rate is regulated, water injection 25 is regulated accordingly.

Moreover, when after regulation the premix gas fuel flow rate and/or the pilot gas fuel flow rate become zero, a purge medium 26 is injected through the premix gas fuel nozzles 6 and/or the pilot gas fuel nozzles 8.

In the same way, when after regulation the liquid fuel 21 flow rate becomes zero, a purge medium 26 is injected through the liquid fuel nozzles 9.

Before the pilot gas fuel 23 is controlled at a substantially constant flow rate, the premix gas fuel 22 and the pilot gas fuel 23 and the liquid fuel 21 are regulated together to bring the burner to a starting switch over condition.

Typically, during the switch over, the gas turbine load is substantially constant; moreover, during switch over from gas fuel operation to liquid fuel operation, the operation temperature decreases and vice-versa (i.e. during switch over from liquid fuel operation to gas fuel operation, the operation temperature increases).

In the following the method will be described in detail for switching over from gas fuel operation to liquid fuel operation and vice-versa.

Figure 2:
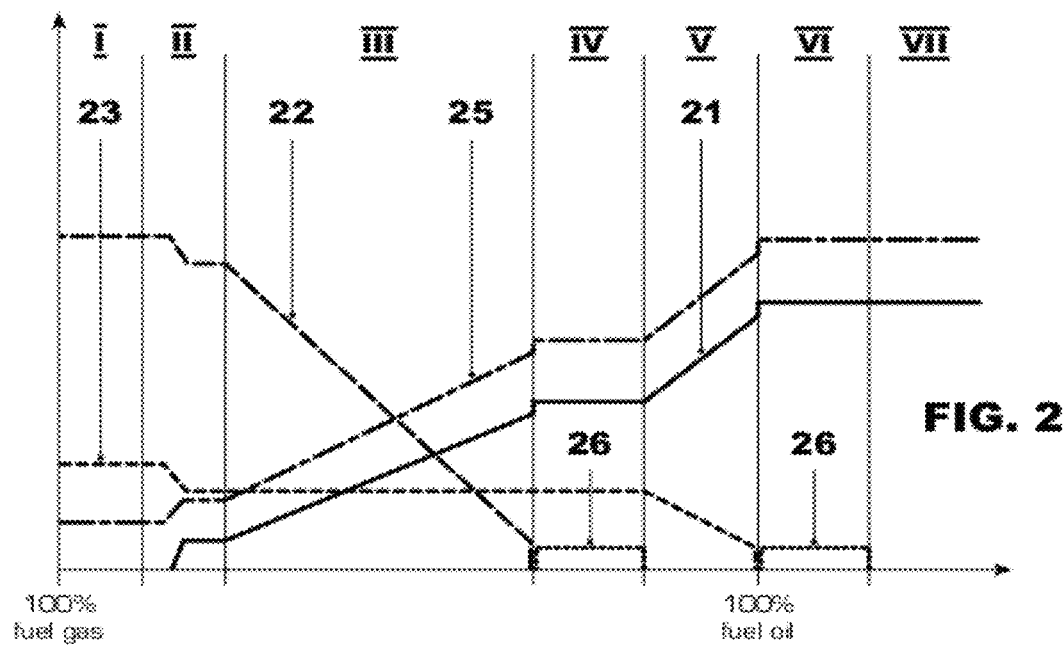
FIG. 2 is a diagram showing the gas fuel and liquid fuel flow rates during switch over from gas fuel operation to liquid fuel operation.

SWITCHING OVER FROM GAS FUEL OPERATION TO LIQUID FUEL OPERATION—With particular reference to FIG. 2, initially premix gas fuel 22 is injected into the swirl chamber 3 through nozzles 6 and pilot gas fuel 23 is injected into the swirl chamber 3 through nozzles 8; no liquid fuel is injected through nozzles 9 and a limited water flow rate 25 is also injected into the swirl chamber 3 (FIG. 2, zone I).

When switching over from gas fuel to liquid fuel operation starts, the premix gas fuel 22, the pilot gas fuel 23 and the liquid fuel 21 are regulated together to reach the switching over start conditions; in this respect (zone II of FIG. 2) the premix gas fuel 22 flow rate is decreased, the pilot gas fuel 23 flow rate is also decreased and the liquid fuel 21 flow rate is increased (from zero); since the liquid fuel 21 flow rate is increased, also the water 25 flow rate is increased.

Then (zone III of FIG. 2) the premix gas fuel 22 flow rate is decreased up to a minimum flow rate to be then switched off and, at the same time, the liquid fuel 21 flow rate and the water 25 flow rate are increased (with a step corresponding to the premix gas fuel switching off); pilot gas fuel 23 flow rate is controlled to be substantially constant.

Afterwards (zone IV of FIG. 2) a purge medium 26 is injected through nozzles 6 to clean them and then (zone V of FIG. 2) pilot gas fuel 23 is decreased up to a minimum flow rate to be then switched off, while liquid fuel 21 and water 25 flow rate are increased with a step corresponding to pilot gas fuel switching off.

Then (zone VI of FIG. 2) a purge medium is injected through nozzles 8 to clean them.

Thus (zone VII of FIG. 2) the burner 1 operates with liquid fuel 21.

Figure 3:
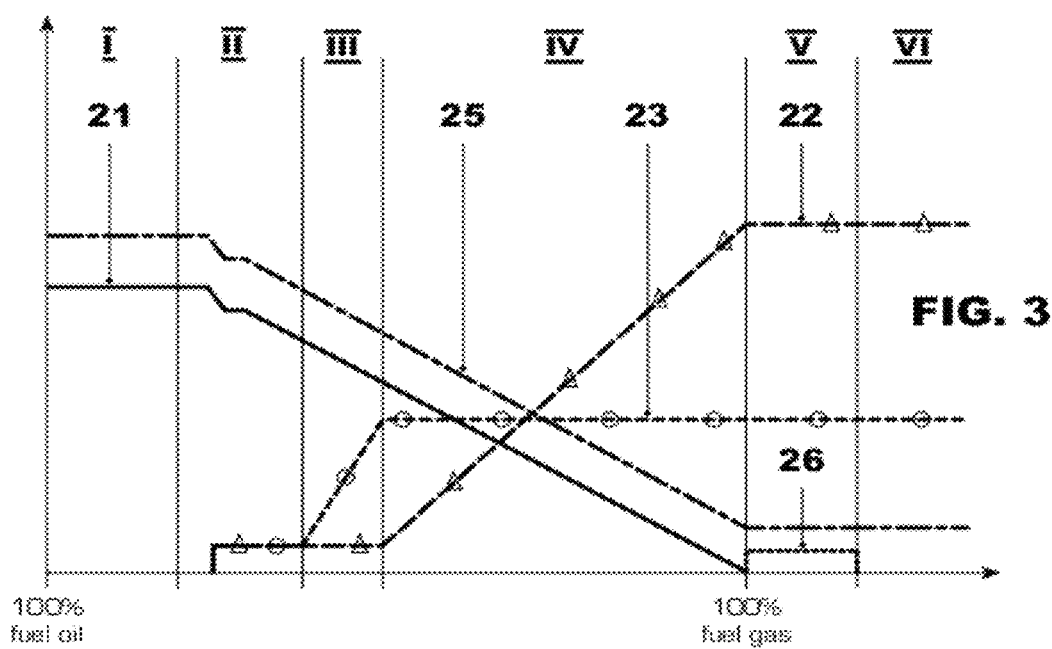
FIG. 3 is a diagram showing the gas fuel and liquid fuel flow rates during switch over from liquid fuel operation to gas fuel operation.

SWITCHING OVER FROM LIQUID FUEL OPERATION TO GAS FUEL OPERATION—With particular reference to FIG. 3, during liquid fuel operation liquid fuel 21 and water 25 are injected into the swirl chamber 3 (zone I of FIG. 3).

At the beginning of switch over, water 25 flow rate and liquid fuel 21 flow rate are regulated to be reduced and premix gas fuel 22 and pilot gas fuel 23 are also regulated to be increased (from zero, zone II of FIG. 3).

Then the pilot gas fuel 23 is further increased up to its operating conditions, while premix gas fuel 22 flow rate is maintained substantially constant; water 25 flow rate and liquid fuel 21 flow rate are also decreased (zone III of FIG. 3).

Then the water 25 flow rate and the liquid fuel 21 flow rate are further decreased until the liquid fuel flow rate is zero and at the same time the premix gas fuel 22 flow rate is increased; during these regulations, pilot gas fuel 23 flow rate is substantially constant, i.e. even if its flow rate is substantially constant, a small control is carried out to control the flame stability (zone IV of FIG. 3).

A purge medium 26 is then injected through nozzles 9 (zone V of FIG. 3); thus (zone VI of FIG. 3) the burner operates with gas fuel 22 and 23.

Water and/or nitrogen can be used as a purge medium 26.

Naturally, the features described may be independently provided from one another.

The method conceived in this manner is susceptible to numerous modifications and variants, all falling within the scope of the inventive concept; moreover all details can be replaced by technically equivalent elements.

In practice the materials used and the dimensions can be chosen at will according to requirements and to the state of the art.

REFERENCE NUMBERS 1 burner
2 conical walls
3 swirl chamber
5 slots
6 premix gas fuel nozzles
7 lance
8 pilot gas fuel nozzles of 7

9 liquid fuel nozzles of 7
10 front panel
11 combustion chamber
13 flame
15 plenum
20 air
21 liquid fuel
22 premix gas fuel
23 pilot gas fuel
25 water
26 purge medium

What is claimed is:

1. Method for switching over a gas turbine burner operation from liquid fuel to gas fuel and vice-versa, said burner comprising nozzles for feeding a premixed gas fuel, nozzles for injecting a pilot gas fuel and nozzles for injecting a liquid fuel, the method comprising:

regulating the liquid fuel and the premix gas fuel to switch over from liquid fuel only operation to gas fuel only operation or vice-versa while controlling the pilot gas fuel at a substantially constant flow rate, wherein the regulating the liquid fuel and the premix gas fuel to switch over from liquid fuel only operation to gas fuel only operation or vice-versa while controlling the pilot gas fuel at a substantially constant flow rate comprises:

when switching over from gas fuel only operation to liquid fuel only operation:

increasing a water flow rate for injection of water into the burner, increasing a liquid fuel flow rate for feeding liquid fuel into the burner, decreasing a premix gas fuel flow rate for premix gas fuel to be fed into the burner and controlling a pilot gas fuel flow rate for pilot gas fuel to be fed into the burner such that the pilot gas fuel flow rate is controlled to be substantially constant while the liquid fuel and water flow rates are increased and the premix gas fuel flow rate is decreased to a minimum flow rate;

switching off the premix gas flow to the burner after the premix gas fuel flow rate is at the minimum flow rate; and switching off the pilot gas fuel flow to the burner such that only liquid fuel is fed to the burner for liquid fuel only operation of the burner; and when switching over from liquid fuel only operation to gas fuel only operation:

decreasing the water flow rate for injection of water into the burner, decreasing the liquid fuel flow rate for feeding liquid fuel into the burner, increasing the premix gas fuel flow rate for premix gas fuel to be fed into the burner and controlling the pilot gas fuel flow rate for pilot gas fuel to be fed into the burner such that the pilot gas fuel flow rate is controlled to be substantially constant while the liquid fuel and water flow rates are decreased and the premix gas fuel flow rate is increased; and switching off the liquid fuel to the burner so that the only gas fuel is fed to the burner for gas fuel only operation of the burner.

2. The method as claimed in claim 1, wherein the pilot gas fuel flow rate is controlled at a substantially constant flow rate to control the flame stability.

3. The method as claimed in claim 1, wherein while the liquid fuel flow rate is regulated, water injection is regulated accordingly.

4. The method as claimed in claim 3, wherein, when after regulation the premix gas fuel flow rate and/or the pilot gas fuel flow rate become zero, a purge medium is injected through premix gas fuel nozzles and/or pilot gas fuel nozzles.

5. The method as claimed in claim 3, wherein, when after regulation the liquid fuel flow rate becomes zero, a purge medium is injected through the liquid fuel nozzles.

6. The method as claimed in claim 1, wherein, before the pilot gas fuel is controlled at a substantially constant flow rate, the premix gas fuel and the pilot gas fuel and the liquid fuel are regulated together to bring the burner into starting switch over conditions.

7. The method as claimed in claim 1, wherein, during the switch over, the gas turbine load is substantially constant.

8. The method as claimed in claim 1, wherein, during switch over from gas fuel operation to liquid fuel operation, the operation temperature decreases and during switch over from liquid fuel operation to gas fuel operation, the operation temperature increases.

9. The method as claimed in claim 1, wherein pilot gas fuel is injected through the pilot gas fuel nozzles at a side of a lance or at a tip of the lance or at a front panel.

10. The method as claimed in claim 1, wherein liquid fuel is injected through the liquid fuel nozzles at a tip of a lance.

11. The method as claimed in claim 1, wherein pilot gas is regulated before or after premix gas regulation.

12. The method as claimed in claim 11, wherein during switching over from gas to liquid fuel operation, pilot gas fuel is regulated after premix gas fuel regulation to be switched off.

13. The method as claimed in claim 11, wherein during switching over from liquid to gas fuel operation, pilot gas fuel is regulated before premix gas fuel regulation to be increased up to the operating flow rate.

14. The method as claimed in claim 1, wherein the burner comprises at least two conical shells defining a substantially conical swirl chamber provided with tangential slots for feeding air and the nozzles for feeding the premix gas fuel therein, the nozzles for injecting the pilot gas fuel and a lance disposed centrally in the conical chamber and provided with the nozzles for injecting the liquid fuel.

15. The method of claim 1, wherein, when switching over from gas fuel only operation to liquid fuel only operation:

injecting a purge medium into the nozzles for injecting the premix gas fuel into the burner after switching off the premix gas flow to the burner;

injecting a purge medium into the nozzles for injecting a pilot gas fuel after the switching off of the pilot gas fuel flow to the burner.

16. The method of claim 15, wherein when switching over from liquid fuel only operation to gas fuel only operation:

injecting a purge medium into the nozzles for injecting the liquid fuel into the burner after switching off liquid fuel flow to the burner.

17. The method of claim 1, wherein the premix gas fuel flow rate is further increased when the liquid fuel to the burner is switched off.

18. The method of claim 1, comprising:

switching from liquid fuel only operation to gas fuel only operation; and switching from gas fuel only operation to liquid fuel only operation.

* * * * *